United States Patent
Gourlay et al.

(10) Patent No.: US 9,225,595 B2
(45) Date of Patent: Dec. 29, 2015

(54) METHOD AND SYSTEM FOR ZERO TOUCH REPLACEMENT OF NETWORK INFRASTRUCTURE

(71) Applicants: Douglas Alan Gourlay, San Francisco, CA (US); Andre Henri Joseph Pech, San Francisco, CA (US); Ariff Premji, Redmond, WA (US)

(72) Inventors: Douglas Alan Gourlay, San Francisco, CA (US); Andre Henri Joseph Pech, San Francisco, CA (US); Ariff Premji, Redmond, WA (US)

(73) Assignee: Arista Networks, Inc., Santa Clara, CA (US)

( * ) Notice: Subject to any disclaimer, the term of this patent is extended or adjusted under 35 U.S.C. 154(b) by 70 days.

(21) Appl. No.: 13/930,026

(22) Filed: Jun. 28, 2013

(65) Prior Publication Data
US 2015/0003282 A1    Jan. 1, 2015

(51) Int. Cl.
*H04L 12/24* (2006.01)
*H04L 12/931* (2013.01)

(52) U.S. Cl.
CPC ............ *H04L 41/0806* (2013.01); *H04L 49/65* (2013.01)

(58) Field of Classification Search
CPC ..... H04L 41/0806; H04L 69/40; H04L 63/20; G06F 11/2028
USPC .................................................. 370/252–254
See application file for complete search history.

(56) References Cited

U.S. PATENT DOCUMENTS

| | | | |
|---|---|---|---|
| 2006/0190766 A1* | 8/2006 | Adler et al. | 714/13 |
| 2006/0215581 A1* | 9/2006 | Castagnoli | 370/254 |
| 2012/0023207 A1* | 1/2012 | Gandhewar et al. | 709/221 |

* cited by examiner

*Primary Examiner* — Jamal Javaid
(74) *Attorney, Agent, or Firm* — Osha · Liang LLP

(57) ABSTRACT

A method for configuring a switch. The method includes receiving a configuration request from a switch, where the configuration request includes switch neighbor information (SNI) for the switch and a Media Access Control (MAC) address for the switch, identifying a replacement entry including a second MAC address and the SNI. The method further includes, based on the identification obtaining configuration information associated with the replacement entry, where the configuration information specifies a configuration of a second switch associated with the second MAC address, generating a configuration script using the configuration information and sending the configuration script to the switch, where the configuration script is executed by the switch to configure the switch.

20 Claims, 6 Drawing Sheets

METHOD AND SYSTEM FOR ZERO TOUCH REPLACEMENT OF NETWORK INFRASTRUCTURE

BACKGROUND

Initial configuration of network infrastructure such as routers and switches is typically a time consuming and manual process. This configuration process is often repeated when the network infrastructure fails. For example, a network administrator may spend an equal amount of time on the initial configuration of a particular switch and on subsequent configuration of a replacement switch when the particular switch fails.

SUMMARY

In general, embodiments of the invention relate to a non-transitory computer readable medium comprising instructions, which when executed by a processor perform a method, the method comprising receiving a configuration request from a switch, wherein the configuration request comprises switch neighbor information (SNI) for the switch and a Media Access Control (MAC) address for the switch identifying a replacement entry comprising a second MAC address and the SNI, based on the identification: obtaining configuration information associated with the replacement entry, wherein the configuration information specifies a configuration of a second switch associated with the second MAC address, generating a configuration script using the configuration information, sending the configuration script to the switch, wherein the configuration script is executed by the switch to configure the switch.

In general, in one aspect, the invention relates to a system, comprising a switch directly connected to a plurality of switches, a configuration server operatively connected to the switch, a dynamic host configuration protocol (DHCP) server operatively connected to the switch, wherein the DHCP server is configured to receive a DHCP request from the switch and, in the DHCP request, provide a first internet protocol (IP) address and a second IP address to the switch, wherein the switch is configured to: associate the first IP address with a network interface on the switch, issue a configuration request to the configuration server using the network interface and the second IP address, wherein the second IP address is associated with the configuration server, wherein the configuration request comprises switch neighbor information (SNI) for the switch and a Media Access Control (MAC) address for the switch, receive a configuration script from the configuration server, wherein the configuration script is executed by the switch to configure the switch, wherein the configuration server is configured to: receive the configuration request from the switch, identify a replacement entry comprising a second MAC address and the SNI, based on the identification: obtain configuration information associated with the replacement entry, wherein the configuration information specifies a configuration of a second switch associated with the second MAC address, generate the configuration script using the configuration information, send the configuration script to the switch.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for enabling zero-touch replacement (ZTR) of network infrastructure. More specifically, one or more embodiments of the invention enable a user (e.g., a network administrator) to automate (or substantially automate) the configuration of a newly deployed switch or a replacement switch using neighbor information. The following description describes embodiments of the invention in which a switch fails and a replacement switch is configured using the ZTR mechanism described below. However, the invention is not limited to switches; rather, embodiments of the invention may be extended to enable ZTR for other network elements, such as routers, provided that such network elements are able to obtain neighbor information (described below).

Figure 1:
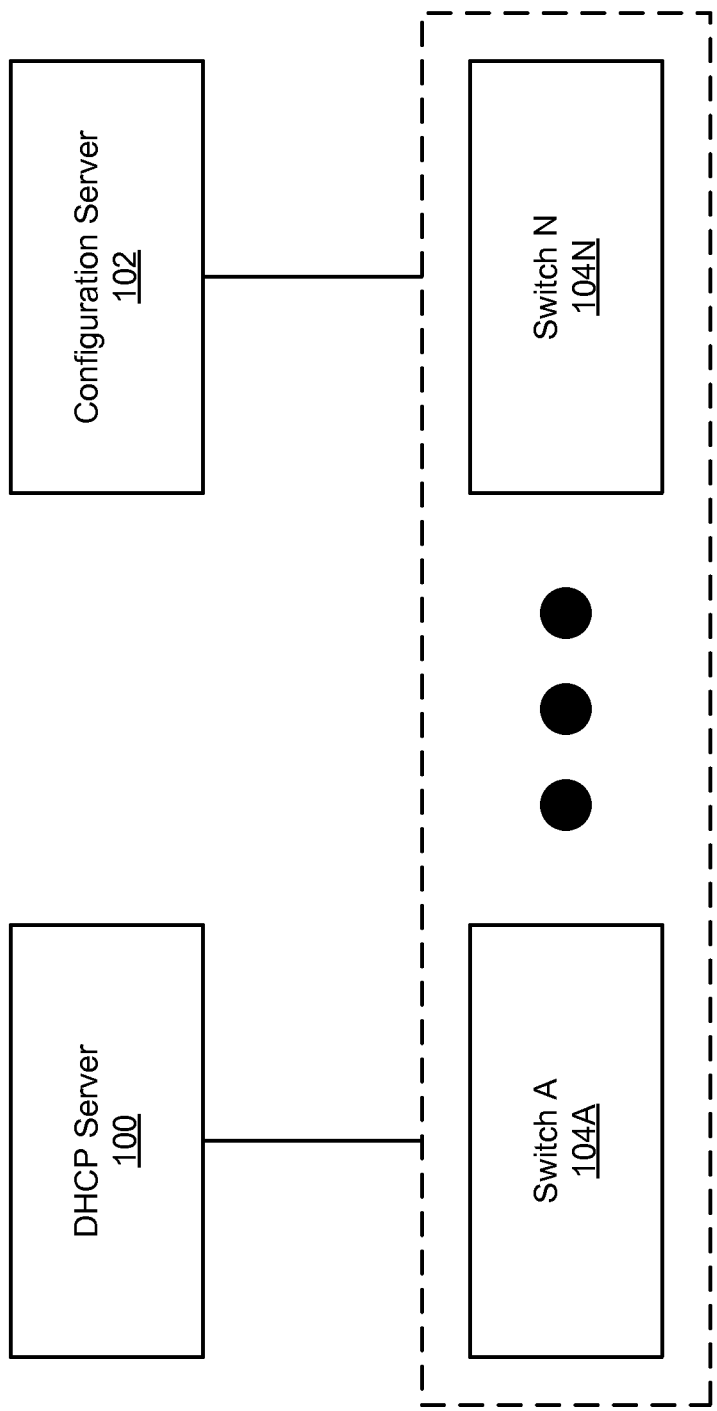
FIG. 1 shows a system in accordance with one or more embodiments of the invention.

FIG. 1 shows a system in accordance with one or more embodiments of the invention. The system includes one or more switches (104A, 104N), a dynamic host configuration protocol (DHCP) server (100), and a configuration server (102). Each of these components is described below.

In one embodiment of the invention, a switch (104A, 104B) is a physical device that includes persistent storage, memory (e.g., Random Access Memory), one or more processors, and two or more physical ports. Each port may be connected to either: (i) a computer system or (ii) a network device. The computer system may include any type of system (including servers) that is configured to send and receive packets. The network device includes any device that is part of the network infrastructure such as a switch or a router. Each switch is configured to receive packets via the ports and determine whether to (i) drop the packet or (ii) send the packet out over another one of the ports on the switch. How the switch makes the determination of whether to drop or send the packet depends on whether the switch is a layer-2 (L2) switch or a layer-3 (L3) switch (also referred to as multilayer switch). If the switch is operating as a L2 switch, the switch uses the destination media access control (MAC) address in the received packet along with a forwarding table to determine out of which port to send the packet. If the switch is operating as a L3 switch, the switch uses the destination internet protocol (IP) address in the received packet along with a routing table to determine out of which port to send the packet.

In addition to the above functionality, the switches may include functionality to operate as a DHCP client in order to obtain one or more IP address (as described below in FIG. 3A). The switches may also include functionality to issue hypertext transfer protocol (HTTP) requests (e.g., a GET request) and receive HTTP responses. Further, the switches include functionality to execute other protocols such as link layer discovery protocol (LLDP), and execute configuration scripts.

In one embodiment of the invention, the persistent storage in the switch may include any non-transitory computer readable medium including instructions, which when executed by the one or more processors in the switch, enable the switch to perform the functions described in this application.

In one embodiment of the invention, the DHCP server (100) is an application that is configured to receive DHCP requests from DHCP clients (such as the switches) and provide the requested IP address(es). The DHCP server may be executing on a physical server or in a virtual machine (or other virtualized environment) executing on a physical server. Regardless of the implementation the DHCP server is operatively connected to the switches. In one embodiment of the invention, the DHCP server or the physical server on which the DHCP server is executing is directly connected to one of the switches and is accessible to other switches via this switch.

In one embodiment of the invention, the configuration server (102) is an application that is configured to receive HTTP requests and generate corresponding HTTP responses. In one embodiment of the invention, the configuration server (102) includes functionality to perform steps 316-328 in FIG. 3B. Additional detail about the configuration server is provided below. The configuration server may be executing on a physical server or in a virtual machine (or other virtualized environment) executing on a physical server. Regardless of the implementation the configuration server is operatively connected to the switches. In one embodiment of the invention, the configuration server or the physical server on which the DHCP server is executing is directly connected to one of the switches and is accessible to other switches via this switch.

The invention is not limited to the system configuration shown in FIG. 1.

Figure 2A:
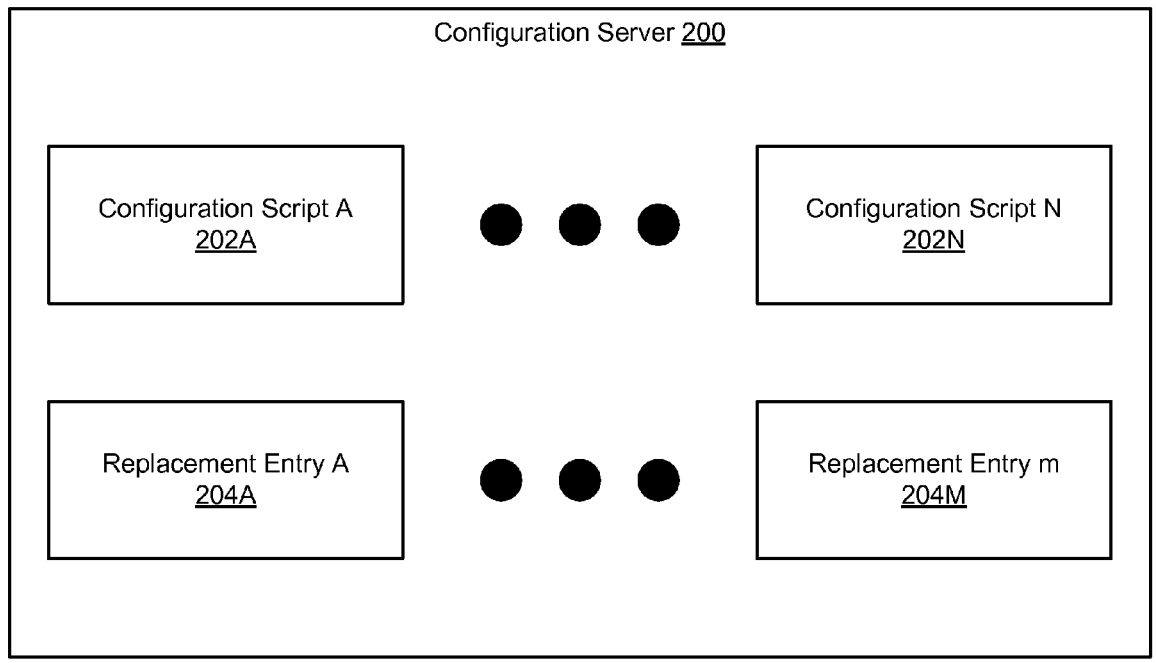
FIG. 2A shows a configuration server in accordance with one or more embodiments of the invention.

FIG. 2A shows a configuration server in accordance with one or more embodiments of the invention. As discussed above, the configuration server includes functionality to implement the method (or portions thereof) shown in FIG. 3B. In order to perform the method shown in FIG. 3B, the configuration server (200) includes functionality to create and/or maintain replacement entries (204A, 204N) and configuration scripts (202A, 202N). The number of replacement entries and configuration scripts may vary based on the implementation of the invention. Depending on how embodiments of the invention are implemented, the replacement entries may be located on the configuration server or on a storage medium (persistent or volatile) that is operatively connected to the configuration server.

Continuing with the discussion of FIG. 2A, in one embodiment of the invention, there is one replacement entry in the configuration for each network element (e.g., switch, router, etc.) that the configuration server has configured. Additional detail about the content of the replacement entries is described below in FIG. 2B.

In one embodiment of the invention, each configuration script is an executable program that may be executed by a network element in order to configure the network element. Said another way, the network element is "configured" after the configuration script has been successfully executed by the network element. Depending on the implementation of the invention, there may be (i) one configuration script for all network elements; (ii) one configuration script for each type or sub-type of network element (i.e., different models of the same network element); (iii) one configuration script for each of the network elements to be configured by the configuration server; or any combination thereof.

Alternatively, the configuration server may include a generic configuration script that it subsequently customizes based on the particular network element on which it is to be executed. Once the configuration script has been customized, it is provided to the network element for execution.

Alternatively, the configuration server may include functionality to create configuration scripts using information for an appropriate replacement entry. In such cases, the configuration server may include configuration script templates that may be used along with the appropriate replacement entries to generate a custom configuration script for a particular network element.

In one embodiment of the invention, once the configuration script has completed execution on the network element, the network element may include functionality to send a notification to the configuration server indicating that the configuration was successful. Alternatively, if the execution of the configuration script was not successful, the network element may send a notification indicating that the configuration script was not successfully executed and, optionally, information about why the execution was not successful. The issuance of the aforementioned notifications may be based on instructions included in the configuration script executed by network element.

Though not shown in FIG. 2A, the configuration scripts (if present) and the replacement entries may be maintained using any data structure.

Figure 2B:
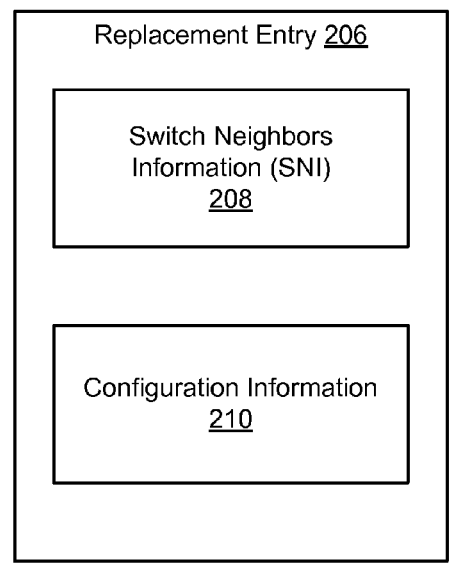
FIG. 2B shows a replacement entry in accordance with one or more embodiments of the invention.

FIG. 2B shows a replacement entry in accordance with one or more embodiments of the invention. In one embodiment of the invention, each replacement entry (206) includes switch neighbors information (SNI) (208) and configuration information (210). The SNI (208) specifies to which other network elements the switch (identified using the configuration information (210)) is directly connected. The SNI (208) may be determined using Link Layer Discovery Protocol (LLDP). In another embodiment of the invention, the SNI (208) specifies to which other network elements the switch (identified using the configuration information (210)) is directly connected on a per-port basis (e.g., port x is connected to network element 1 and port y is connected to network element 2). Other protocols/mechanism may be used to determine SNI without departing from the invention, e.g., OSPF neighbor ID and/or IEEE 802.1x supplicant ID may be used to determine SNI.

While SNI has been described with respect to a particular network element (i.e., a switch), if the network element is not a switch, the then replacement entry may include other appropriate neighbor information. Depending on the type of network element, LLDP may be used to obtain other neighbor information.

In one embodiment of the invention, the configuration information (210) includes information that specifies the current configuration of the switch. The configuration information may include, but is not limited to, a serial number for the switch, a device identification (ID) type for the switch, a firmware version of firmware on the switch, software version for the software (other than firmware) on the switch, services configured on the switch (e.g., Simple Network Management Protocol (SNMP), Telnet, Secure Shell (SSH), etc.), and other switch configuration parameters (e.g., VLAN configuration, access control list (ACL) configuration, etc.).

The configuration information in the replacement entries may correspond to the current configuration of the switch or to the configuration of the switch the last time the particular replacement entry was updated.

Figure 3A:
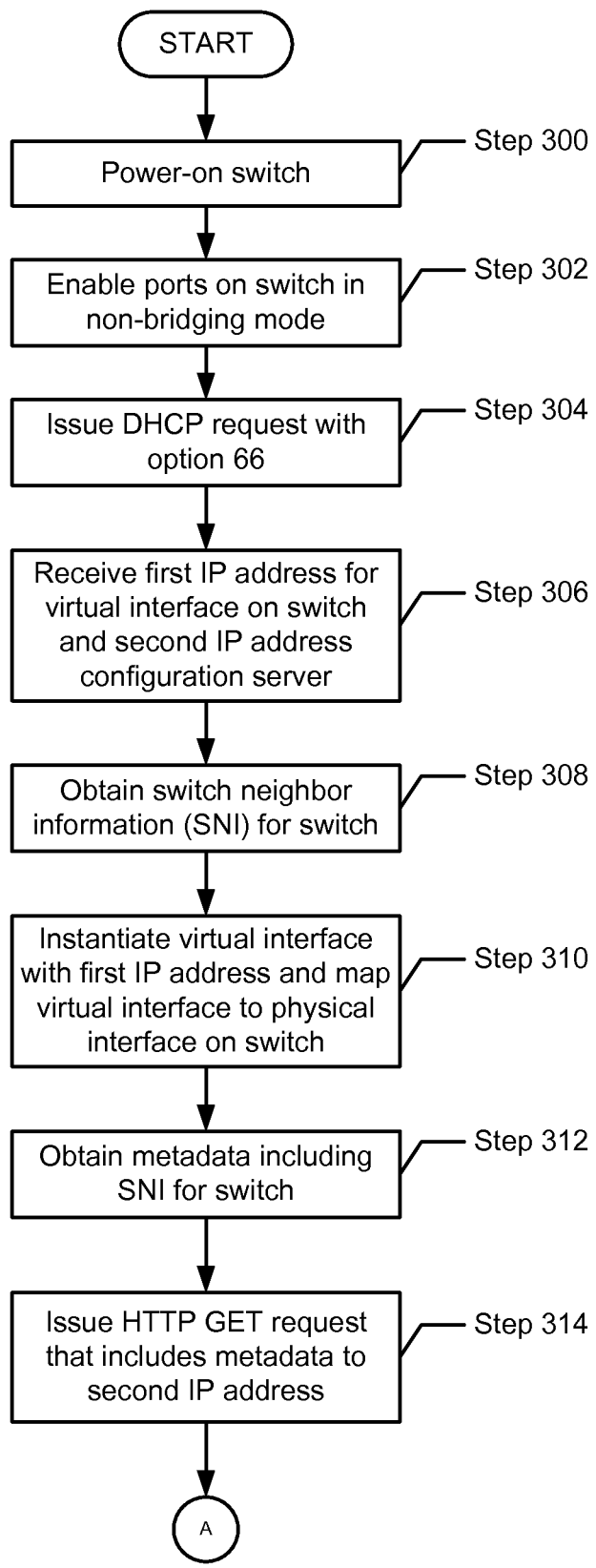
FIGS. 3A-3B show a flowchart for performing a zero touch replacement in accordance with one or more embodiments of the invention.
Figure 3B:
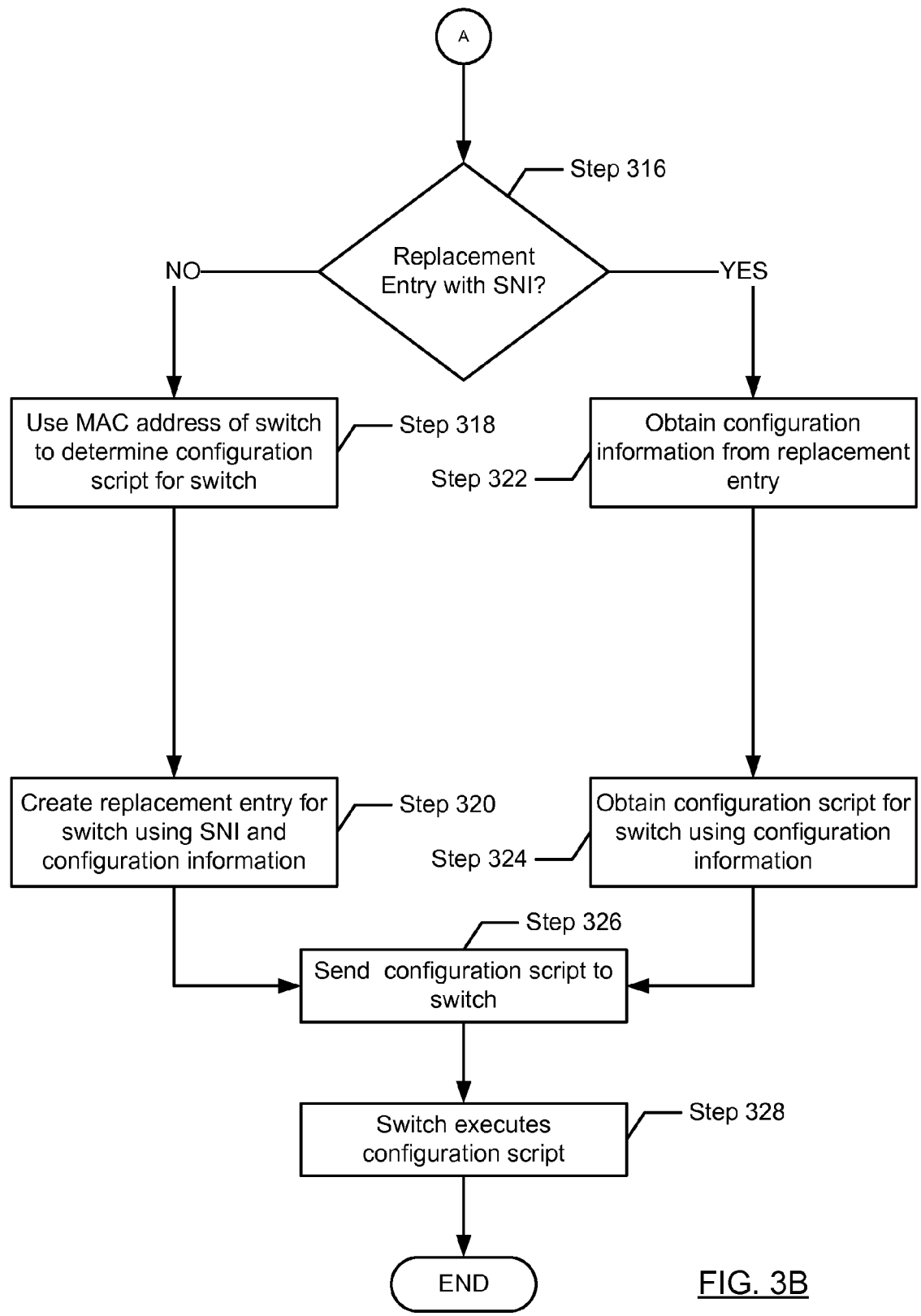

FIGS. 3A-3B show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in FIGS. 3A-3B may be performed in parallel with any other steps shown in FIGS. 3A-3B without departing from the invention.

Turning to FIGS. 3A-3B, in Step 300, the switch is powered-on. In Step 302, the ports on the switch are enabled (serially or in parallel) in non-bridging mode. In one embodiment of the invention, while the ports are in non-bridging mode, one or more ports on the switch may be used to perform one or more steps in FIG. 3A. However, while in non-bridging mode, if a port receives a packet that is not related to an operation in one or the steps in FIG. 3A, the packet is dropped (or optionally buffered until the switch transitions to bridging mode).

In Step 304, the switch generates and issues a DHCP request (using a DHCP client on the switch) where option 66 is set or otherwise specified in the DHCP request. The DHCP request is ultimately received and serviced by a DHCP server (e.g., 100 in FIG. 1)

In Step 306, the switch receives a response from the DHCP server that includes two internet protocol (IP) addresses: (i) one IP address corresponding to the configuration server and (ii) one IP address to use on a virtual interface on the switch.

In Step 308, the SNI for the switch is obtained. In one embodiment of the invention, the SNI is obtained using LLDP. More specifically, each of the ports (once enabled) issues and receives Ethernet frames in accordance with the LLDP protocol. The SNI for the switch may be determined using the received LLDP frames. Specifically, the received LLDP frames may be used to identify the network device that issued the LLDP frame and the port of that network device used to issue the frame. This information combined with information about which port on the switch received the particular LLDP frame may be used to determine to which network device each port of the switch is connected. The switch may include functionality to store the SNI, as one or more entries, in a management information base (MIB) located on the switch.

In Step 310, a virtual interface is instantiated on the switch with the IP address obtained from the DHCP server. The virtual interface is subsequently mapped to a port on the switch. To applications executing on the switch, the virtual information appears as a network interface card (or an equivalent physical component).

In Step 312, metadata for the switch is obtained. The metadata may include, but is not limited to, information that (i) identifies the switch (e.g., serial number, media access control (MAC) address, switch model number, etc.) (ii) specifies the current configuration of the switch (e.g., current firmware version, current operating system version), and (iii) the SNI.

In Step 314, an HTTP request (which may also be referred to as configuration request) that includes the metadata is issued to the configuration server using the appropriate IP address obtained from the DHCP server in step 306. In one embodiment of the invention, the HTTP request is a GET request.

In Step 316, the configuration server receives the HTTP request and determines whether the configuration server includes (or is operatively connected to a data store that includes) a replacement entry with the SNI included in the HTTP request. In one embodiment of the invention, the determination in Step 316 is based on whether there is a replacement entry that includes the SNI and a MAC address that is different that the MAC address in the HTTP request. Said another way, step 316 is used to determine whether the switch that issued the HTTP request is a replacement switch (i.e., a switch that is replacing a previously configured switch that is no longer active). A switch is deemed to be a replacement switch of a prior configured switch if it is has the same neighbors (as determined by the SNI) but a different MAC address than the prior configured switch. In other embodiments of the invention, the SNI (without the MAC address) may be used to determine whether the switch that issued the HTTP request is a replacement switch.

In one embodiment of the invention, in step 316, in order for the SNI in the HTTP request to match the SNI in the replacement entry, the SNIs need only indicate that the replacement switch (regardless of which ports are used) is connected to the same network elements as the switch it is replacing. Alternatively, in order for the SNI in the HTTP request to match the SNI in the replacement entry, the SNIs must not only indicate that the replacement switch is connected to the same network elements as the switch it is replacing but also that the ports on the replacement switch are connected to same network elements in the same configuration as ports on the switch being replaced.

Continuing with the discussion of FIG. 3B, if the configuration server includes (or is operatively connected to a data store that includes) a replacement entry with the SNI included in the HTTP request then the process proceeds to step 324; otherwise, the process proceeds to Step 318. Said another way, the process proceeds to Step 318 if this is the first time the switch with the particular SNI is being configured (i.e., the switch is not a replacement switch); alternatively, if any switch with the particular SNI has been previously configured then the process proceeds to Step 322 (i.e., the switch that issued the HTTP request is a replacement switch).

In Step 318, metadata from the HTTP request is used to determine what configuration script should be obtained/generated for the switch. More specifically, the configuration server uses the metadata (or portions thereof, e.g., the MAC address) to determine the appropriate configuration script to use to configure the switch or to determine the appropriate configuration script to generate in order to configure the switch. As discussed above, the generation of the configuration may involve using the metadata (or portions thereof).

In Step 320, a replacement entry for the switch is created using the SNI and metadata (or portions thereof) provided by the HTTP request received in Step 316. Depending on the implementation of the invention, various portions of the metadata may be used to populate the configuration information portion of the replacement entry. Further, the configuration information for the replacement entry may also be supplied by the configuration server. In particular, once the configuration script for the switch has been generated or otherwise obtained, the configuration server may, based on the configuration script, determine the proposed state of the switch that will result once the configuration script has been successfully executed. This information about the proposed state of the switch may then be used to populate the configuration information portion of the replacement entry. Once the replacement entry has been created it is subsequently stored with the other replacement entries maintained (or otherwise managed) by the configuration server. The process then proceeds to Step 326.

In the event that the switch is a replacement switch (as determined in Step 316), the process proceeds to step 322. In step 322, the configuration information from the replacement entry with the SNI (i.e., the SNI provided via the HTTP request) is obtained.

In Step 324, configuration information may then be used to (i) generate a configuration script, (ii) select an appropriate configuration script; or (iii) perform a combination of (i) and (ii). Regardless of how the configuration script is generated (or otherwise obtained), the purpose of the configuration script is to change (as appropriate) the state of the replacement switch to the state of the switch that the replacement switch is replacing. (see e.g., FIGS. 4A-4C).

Depending on the implementation of step 316, the configuration script generated in step 324 may include instructions to address the different port-to-network element mapping in the replacement switch as compared with that of the switch being replace. For example, the replacement switch may have port 1 connected to network element A, while the switch being replaced has port 2 connected to network element A.

Continuing with the discussion of FIG. 3B, in Step 326, the configuration script (from Step 318 or 324) is sent to the switch (i.e., the switch that initially sent the HTTP request). The configuration script may be transmitted to the switch using HTTP. The configuration server may also send additional data/files to the switch that are necessary for the configuration of the switch. The data/files may be transmitted along with the configuration script or may transmitted separately from the configuration script.

In Step 328, the switch executes the configuration script received in Step 326. If successfully executed, the switch is deemed to be configured. Once configured the switch may enable the ports to operate in bridging mode.

While FIGS. 3A-3B have been described with respect to a switch, embodiments shown in FIGS. 3A-3B may be implemented by other network devices without departing from the invention.

In one embodiment of the invention, the configuration of the replacement switch using a configuration script based on the last configuration of the switch being replaced may include (i) downgrading the software on the replacement switch to a version of software that was executing on the switch being replaced; (ii) disabling one or more ports on the replacement switch if the number of ports on the replacement switch exceeds the number of ports on the switch being replaced; (iii) upgrading the software on the replacement switch to a version of software that was executing on the switch being replaced.

As updates are made on the switches for which the configuration server maintains a replacement entry, the updates are provided to the configuration server such that the configuration server may (i) update the SNI and/or (ii) update the configuration information. In one embodiment of the invention, the configuration information in the replacement entry for a switch includes sufficient information to configure a replacement switch to the most recent configuration/state of the switch. The updates may be sent to the configuration server using any known mechanism without departing from the invention. Further, the replacement entries may be updated based on the received updates using any known configuration information without departing from the invention.

In one or more embodiments of the invention, the method shown in FIGS. 3A and 3B (or portions thereof) may be performed multiple times before there is sufficient information to unambiguously identify the switch using neighbor information in order to permit identification of the configuration information. For example, when the aforementioned method is first performed, the switch may not be able to discern sufficient information about its neighbors in order to obtain the proper configuration information and, as such, will perform the method (or portions thereof) one or more additional times in order to obtain sufficient information about its neighbors to enable the correct configuration information for the switch to be identified.

Figure 4A:
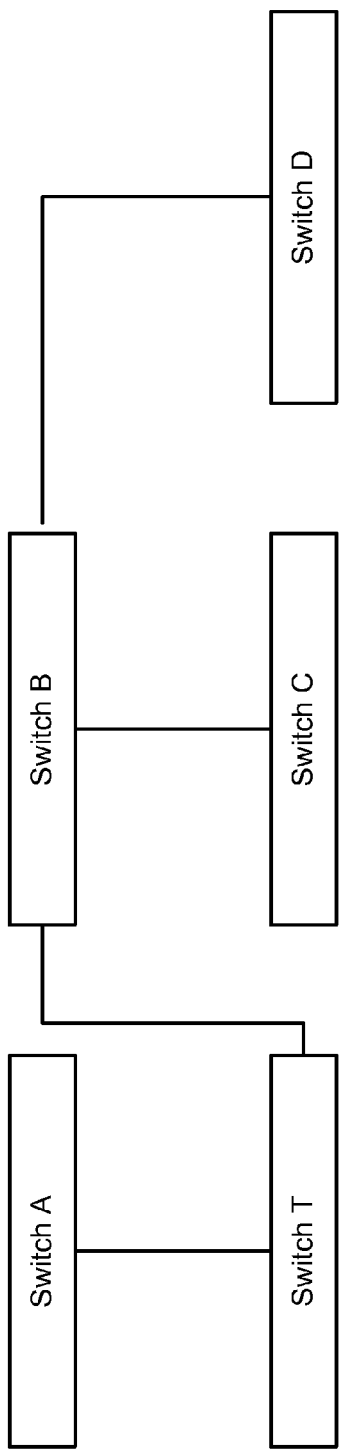
FIGS. 4A-4C show an example in accordance with one or more embodiments of the invention.
Figure 4B:
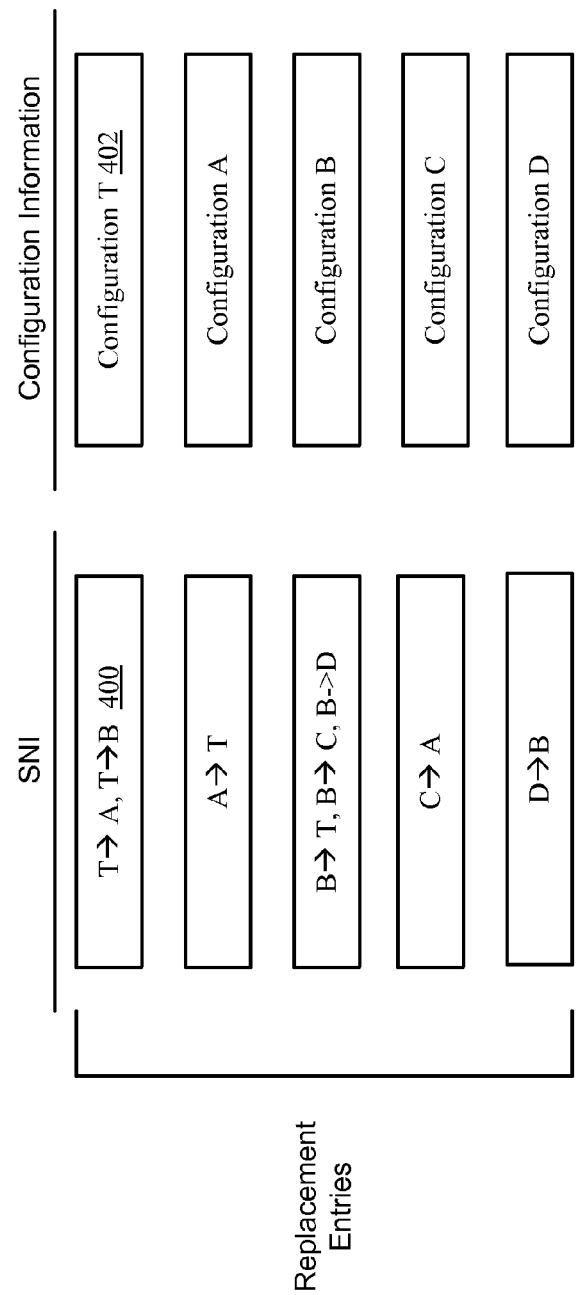
Figure 4C:
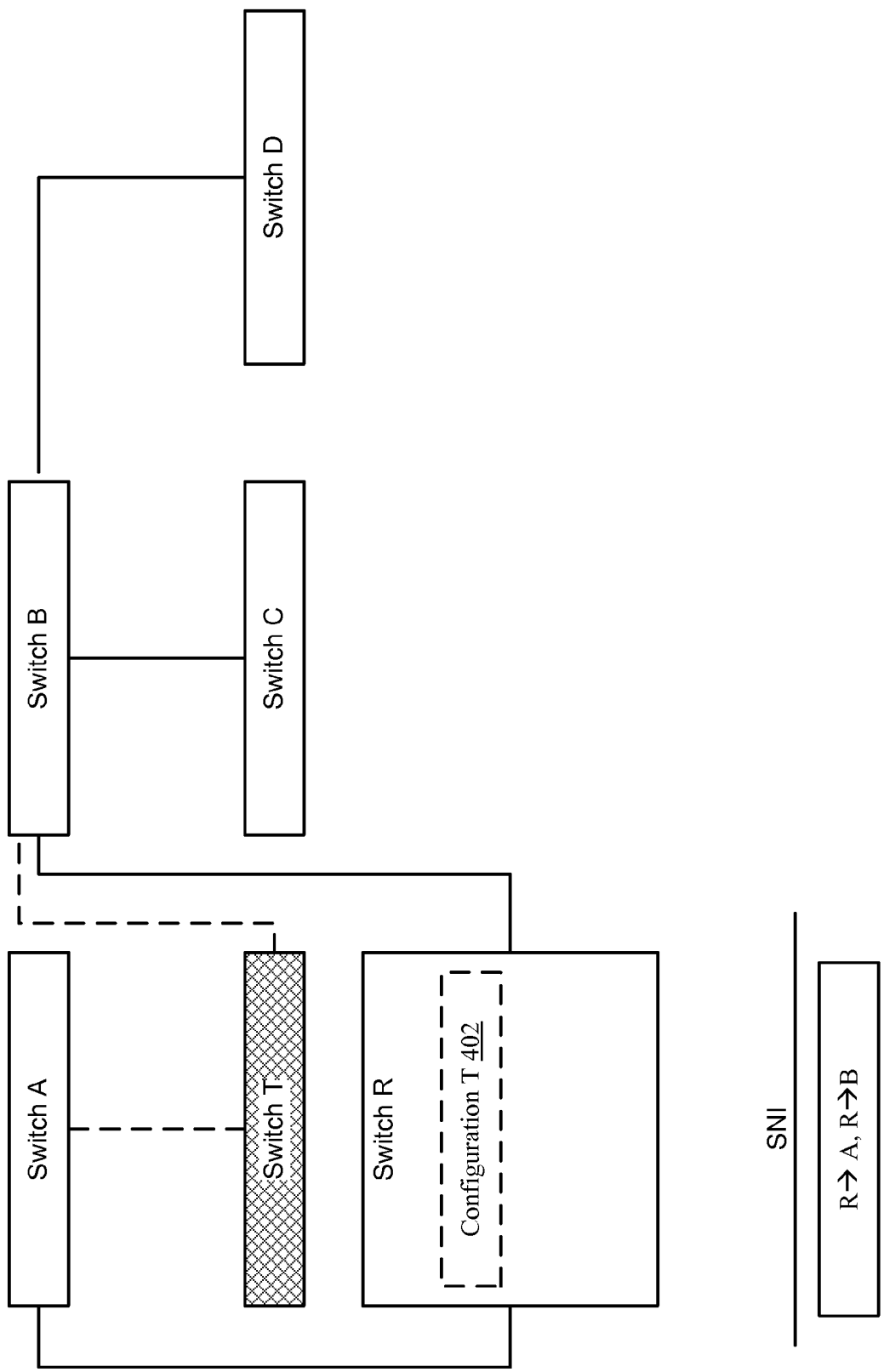

FIGS. 4A-4C show an example in accordance with one or more embodiments of the invention. The example is not intended to limit the scope of the invention.

Referring to FIG. 4A, consider the scenario in which there is a network that includes five switches (Switch A-D, T), where the switches are connected as follows: (i) switch A is connected to switch T and (ii) switch B is connected to switch C, switch, D, and switch T. Though not shown in FIG. 4A, each of the switches may be connected to other network elements (not shown) and/or computer systems (not shown).

Referring to FIG. 4B, FIG. 4B shows the replacement entries for each of the aforementioned switches. In particular, the replacement entries include SNI and configuration information for each of the switches. For purposes of this example assume that the configuration information in the replacement entries corresponds to the current configuration of each of the switches shown in FIG. 4A.

Referring to FIG. 4C, assume that Switch T fails or is otherwise rendered inoperative requiring Switch T to be replaced with Switch R. In one or more embodiments of the invention, once Switch R is physically connected to Switch A and Switch B (i.e., the switches to which Switch T was previously connected), Switch R may perform the steps described in FIG. 3A. In performing these steps, Switch R may obtain SNI that specifies it is connected to Switch A and Switch B. This information is subsequently provided to the configuration server (not shown) via an HTTP request. Upon receipt of the HTTP request, the configuration server obtains the SNI from the HTTP request and determines that there is another replacement entry that includes the same SNI (see 400 in FIG. 4B). This determination results in the configuration server identifying switch R as a replacement switch (i.e., a switch to replace switch T). Accordingly, the configuration server generates a configuration script that, when executed, results in switch R being configured to be the same as the last configuration (Configuration T (402)) of switch T.

Embodiments of the invention enable efficient configuration of a replacement switch with minimal input from a system administrator. As a result, the downtime associated with replacing a switch may be significantly reduced using one or more embodiments of the invention.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor perform a method, the method comprising:
receiving a configuration request from a switch, wherein the configuration request comprises switch neighbor information (SNI) for the switch and a Media Access Control (MAC) address for the switch;
identifying a replacement entry comprising a second MAC address and the SNI;
based on the identification:
obtaining configuration information associated with the replacement entry, wherein the configuration information specifies a configuration of a second switch associated with the second MAC address;
generating a configuration script using the configuration information;
sending the configuration script to the switch, wherein the configuration script is executed by the switch to configure the switch.

2. The non-transitory computer readable medium of claim 1, the method further comprising:
receiving a second configuration request from a third switch, wherein the configuration request comprises a second SNI for the second switch and a third MAC address for the third switch;
determining that there is no replacement entry comprising the second SNI;
based on the determination:
determining a second configuration script for the third switch;
obtaining second configuration information for the third switch based on the configuration script;
generating a second replacement entry comprising the second configuration and the second SNI;
sending the second configuration script to the third switch, wherein the second configuration script is executed by the third switch to configure the third switch.

3. The non-transitory computer readable medium of claim 1, wherein the configuration request is a Hypertext Transfer Protocol (HTTP) request.

4. The non-transitory computer readable medium of claim 1, wherein the configuration request further comprises a serial number for the switch, a device identification (ID) type for the switch, a firmware version of firmware on the switch, and a software version of software on the switch.

5. The non-transitory computer readable medium of claim 4, wherein configuration information specifies a second software version for the second switch, wherein the configuration script comprises instructions to change the software on the switch to the second software version.

6. The non-transitory computer readable medium of claim 5, wherein the second software version is an older version of the software than the first software version.

7. The non-transitory computer readable medium of claim 5, wherein the second software version is a newer version of the software than the first software version.

8. The non-transitory computer readable medium of claim 1, wherein the switch comprises a first number of ports and the second switch comprises a second number of ports, wherein the first number of ports exceeds the second number of ports.

9. The non-transitory computer readable medium of claim 1, wherein the SNI identifies a plurality of switches directly connected to the switch.

10. The non-transitory computer readable medium of claim 9, wherein the SNI is determined using link layer discovery protocol (LLDP).

11. A system, comprising:
a switch directly connected to a plurality of switches;
a configuration server operatively connected to the switch;
a dynamic host configuration protocol (DHCP) server operatively connected to the switch;
wherein the DHCP server is configured to receive a DHCP request from the switch and, in the DHCP request, provide a first internet protocol (IP) address and a second IP address to the switch;
wherein the switch is configured to:
associate the first IP address with a network interface on the switch;
issue a configuration request to the configuration server using the network interface and the second IP address, wherein the second IP address is associated with the configuration server, wherein the configuration request comprises switch neighbor information (SNI) for the switch and a Media Access Control (MAC) address for the switch;
receive a configuration script from the configuration server, wherein the configuration script is executed by the switch to configure the switch;
wherein the configuration server is configured to:
receive the configuration request from the switch;
identify a replacement entry comprising a second MAC address and the SNI;
based on the identification:
obtain configuration information associated with the replacement entry, wherein the configuration information specifies a configuration of a second switch associated with the second MAC address;
generate the configuration script using the configuration information;
send the configuration script to the switch.

12. The system of claim 11, wherein the configuration information corresponds to a last configuration of the second switch.

13. The system of claim 11, wherein the switch and the second switch are not concurrently operating.

14. The system of claim 11, wherein prior to receiving the configuration request the second switch is operating in bridging mode.

15. The system of claim 11, wherein prior to executing the configuration script the switch is operating in non-bridging mode.

16. The system of claim 11,
wherein prior to receiving the configuration request the second switch is operating in bridging mode, and
wherein prior to executing the configuration script the switch is operating in non-bridging mode.

17. The system of claim 11, wherein SNI in the replacement entry equals the SNI in the configuration request when:

the SNI in the configuration request specifies that the switch is connected to a network element using a first port on the switch and a second network element using a second port on the switch, and the SNI in the replacement entry specifies that the second switch is connected to the network element using a second port on the second switch and second network element using a first port on the second switch.

18. The system of claim 17, wherein the network element is a third switch.

19. The system of claim 11, wherein SNI in the replacement entry does not equal the SNI configuration request when:

the SNI in the configuration request specifies that the switch is connected to a network element using a first port on the switch and a second network element using a second port on the switch, and the SNI in the replacement entry specifies that the second switch is connected to the network element using a second port on the second switch and second network element using a first port on the second switch.

20. The system of claim 19, wherein the network element is a third switch.

* * * * *